US008700908B2

(12) United States Patent
Rickman (10) Patent No.: US 8,700,908 B2
(45) Date of Patent: Apr. 15, 2014

(54) SYSTEM AND METHOD FOR MANAGING SECURE INFORMATION WITHIN A HYBRID PORTABLE COMPUTING DEVICE

(75) Inventor: Gregory M. Rickman, Atlanta, GA (US)

(73) Assignee: QUALCOMM Incorporated, San Diego, CA (US)

( * ) Notice: Subject to any disclaimer, the term of this patent is extended or adjusted under 35 U.S.C. 154(b) by 376 days.

(21) Appl. No.: 12/862,606

(22) Filed: Aug. 24, 2010

(65) Prior Publication Data

US 2012/0054498 A1 Mar. 1, 2012

(51) Int. Cl.
*G06F 21/00* (2013.01)

(52) U.S. Cl.
USPC .............................................. 713/182; 713/19

(58) Field of Classification Search
None
See application file for complete search history.

(56) References Cited

U.S. PATENT DOCUMENTS

| 8,200,582 | B1 * | 6/2012 | Zhu ................................. | 705/64 |
| 2006/0129814 | A1 * | 6/2006 | Eun et al. ....................... | 713/168 |
| 2008/0181406 | A1 * | 7/2008 | Iyer et al. ....................... | 380/277 |
| 2010/0104102 | A1 * | 4/2010 | Brown et al. .................. | 380/277 |

OTHER PUBLICATIONS

Chakrabarti Set al., "Password-Based Authentication: Preventing Dictionary Attacks" Computer IEEE Service Center, Los Alamitos, CA, US, vol. 40, No. 6, Jun. 1, 2007, pp. 68-74, XP011185879, ISSN: 0018-9162.*
Chakrabarti S et al., "Password-Based Authentication: Preventing Dictionary Attacks" Computer IEEE Service Center, Los Alamitos, CA, US, vol. 40, No. 6, Jun. 1, 2007, pp. 68-74, XP011185879, ISSN: 0018-9162, DOI: DOI:10.1109/MC.2007.216.
International Search Report and Written Opinion—PCT/US2011/034118, ISA/EPO—Jul. 19, 2011.

* cited by examiner

*Primary Examiner* — Michael S McNally
*Assistant Examiner* — Carlton Johnson
(74) *Attorney, Agent, or Firm* — Nicholas A. Cole

(57) ABSTRACT

A method and system for managing secure information within a portable computing device are disclosed. The portable computing device includes a program module for communicating with a secure element that is part of the portable computing device. The secure element may receive messages utilizing the decrypted crypto keys derived from a non-padded cipher in order to establish a secure communications channel. The secure element may store at least one of a substantial encryption key for server authentication and a substantial encryption key for decrypting encrypted data stored locally within the portable computing device. If an incorrect password is entered after a predetermined number of times, the secure element may activate security measures which may permanently disable the secure element. To establish secure communications between the secure element and a CPU of the portable computing device, a password based encryption algorithm utilizing a non-padded cipher may be employed.

32 Claims, 8 Drawing Sheets

SYSTEM AND METHOD FOR MANAGING SECURE INFORMATION WITHIN A HYBRID PORTABLE COMPUTING DEVICE

DESCRIPTION OF THE RELATED ART

Portable computing devices (PCDs) are becoming necessities for people on personal and professional levels. These devices may include cellular telephones, portable digital assistants (PDAs), portable game consoles, palmtop computers, and other portable electronic devices.

PCDs are often utilized to conduct financial transactions. For example, PCDs may be used to check bank account balances, transfer funds between bank accounts, and for paying bills. While this ability to conduct financial transactions is a significant benefit for the user of a PCD, the current state of the art requires that a communication link be established between the PCD and a computer server to conduct financial transactions because sensitive financial data is only stored at the computer server. Meanwhile, the PCD is not permitted to store any sensitive financial data locally (within the PCD) when the communication link between the computer server and PCD is not present.

With the PCD not permitted to store any such sensitive financial data, a user of such a PCD cannot access financial data or conduct any financial transactions when the communication link between the computer server and PCD is not present. This is a significant problem because there are multiple situations and geographic locations in which wireless communication links between a PCD and a computer server are not permitted or are very difficult to make.

For example, a business person who often travels by airplane will usually not be permitted to establish communication link between his or her PCD and a computer server while an airplane is in transit. Other exemplary situations in which communication links between a PCD and a computer server are often difficult to make include, but are not limited to, remote geographic locations that do not provide for wireless communications, i.e. the desert, the ocean, sparsely populated areas, etc.

While users of PCDs have requested local storage of sensitive financial data on PCDs in an off-line mode, one of the main problems with local storage of sensitive financial data is how to keep this information secure from unauthorized users of the PCDs.

Accordingly, what is needed is a system and method that may overcome the problems associated with the local storage of sensitive data on a PCD. Another need exists in the art for providing a hybrid portable system with media rich content that enhances a user's experience which may also take advantage of enhanced security features provided by a secure element application.

SUMMARY OF THE DISCLOSURE

A method and system for providing a hybrid mobile wallet are disclosed. The method and system overcomes problems that have been associated with conventional pure baseband software applications which typically do not have secure storage and which usually cannot sufficiently protect cryptographic keys. Meanwhile, such conventional pure baseband software applications typically have an excellent user interface, bulk storage, and network connectivity capabilities. On the other end of the spectrum, conventional pure secure element applications typically have really poor user interfaces and have limited storage and network connectivity, however, conventional secure element applications usually only have secure storage for a small amount of data. The method and system provides a mobile wallet that has an element running on a baseband and an element running on a secure element. These two elements work in tandem thereby gaining the best of the two worlds described above: one associated with pure secure element applications and one associated with pure baseband software applications.

A method for managing secure information within a portable computing device is also disclosed. The method may include initializing a program module of a central processing unit for communicating with a secure element that is part of the portable computing device and receiving a password for gaining access to the secure element. The method may also include initializing a password based encryption algorithm with the password and establishing a secure communication channel between the secure element and the central processing unit based on the password based encryption algorithm. If the password is incorrect, then the method may include determining if a predetermined threshold number of password attempts has been achieved.

A computer system for managing secure information within a portable computing device is also described. The system may include a processor operable to initialize a program module of a central processing unit for communicating with a secure element that is part of the portable computing device and operable to initialize a password based encryption algorithm with the password. The processor may also establish a secure communication channel between the secure element and the central processing unit based on the password based encryption algorithm if the password is correct. The processor may then determine if a predetermined threshold number of password attempts has been achieved if the password is incorrect.

A computer system for managing secure information within a portable computing device is described and may include means for initializing a program module of a central processing unit for communicating with a secure element that is part of the portable computing device. The system may also include means for receiving a password for gaining access to the secure element and means for initializing a password based encryption algorithm with the password. The system may further have means for establishing a secure communication channel between the secure element and the central processing unit based on the password based encryption algorithm. The system may also include means for determining if a predetermined threshold number of password attempts has been achieved if the password is incorrect.

A computer program product comprising a non-transitory computer usable medium having a computer readable program code embodied therein is disclosed. The computer readable program code may be adapted to be execute and to implement a method for managing secure information within a portable computing device that includes initializing a program module of a central processing unit for communicating with a secure element that is part of the portable computing device. The method may also include receiving a password for gaining access to the secure element and initializing a password based encryption algorithm with the password. The method may further include establishing a secure communication channel between the secure element and the central processing unit based on the password based encryption algorithm. If the password is incorrect, then the method may include determining if a predetermined threshold number of password attempts has been achieved.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all Figures.

DETAILED DESCRIPTION

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "communication device," "wireless device," "wireless telephone," "wireless communication device," and "wireless handset" are used interchangeably. With the advent of third generation ("3G") wireless technology, greater bandwidth availability has enabled more portable computing devices with a greater variety of wireless capabilities. Therefore, a portable computing device may include a cellular telephone, a pager, a PDA, a smartphone, a navigation device, or a hand-held computer with a wireless connection or link.

Figure 1A:
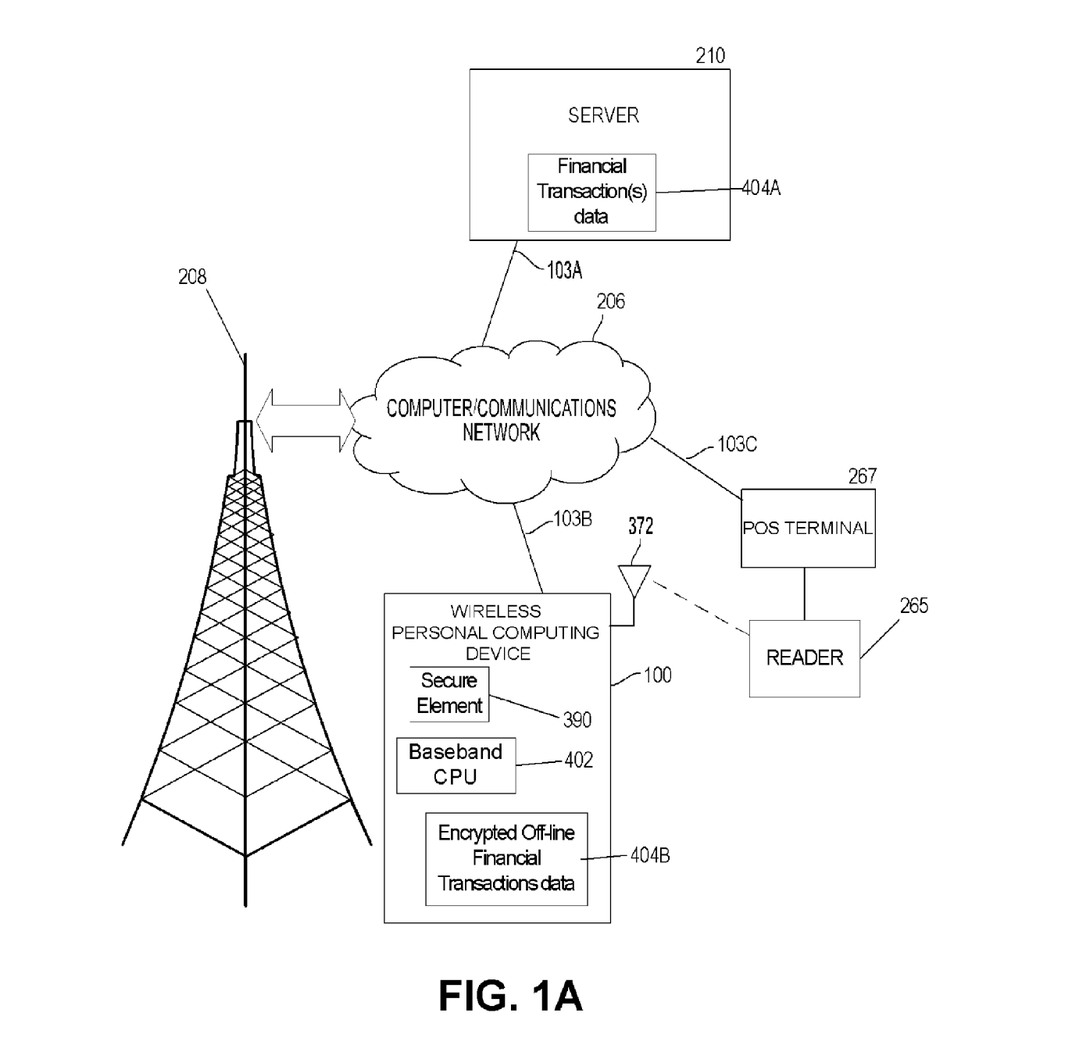
FIG. 1A is a diagram of a wireless portable computing device coupled to a wireless communications network.

Referring initially to FIG. 1A, this figure is a diagram of a wireless portable computing device (PCD) 100 coupled to a wireless communications network 206. Many of the system elements illustrated in FIG. 1A are coupled via communications links 103A-C to the communications network 206. The links 103 illustrated in FIG. 1A may comprise wired or wireless links. Wireless links include, but are not limited to, radio-frequency ("RF") links, infrared links, acoustic links, and other wireless mediums. The communications network 206 may comprise a wide area network ("WAN"), a local area network ("LAN"), the Internet, a Public Switched Telephony Network ("PSTN"), a paging network, or a combination thereof. The communications network 206 may be established by broadcast RF transceiver towers 208. However, one of ordinary skill in the art recognizes that other types of communication devices besides broadcast RF transceiver towers 208 are included within the scope of the invention for establishing the communications network 206.

The server 210 may support and store financial transaction(s) data in a storage device 404A. The financial transaction(s) data may be downloaded and stored in another storage device, such as memory 404A, in the wireless PCD 100. The PCD 100 is shown to have an antenna 372 so that a respective PCD 100 may establish wireless communication links 103 with the communications network 206.

The server 210 may communicate with the wireless PCD 100 across the communications network 206 in order to share its financial transactions data with the PCD 100 that are processed and managed by a secure element 390 and a baseband CPU 402 of the PCD 100. The secure element 390 may also support communications with a reader 265 that is coupled to a point-of-sale (POS) terminal. The secure element 390 of the PCD 100 may support various types of transactions, such as purchases, money transfers, etc. similar to those supported by conventional smart cards, as understood by one of ordinary skill the art.

Figure 1B:
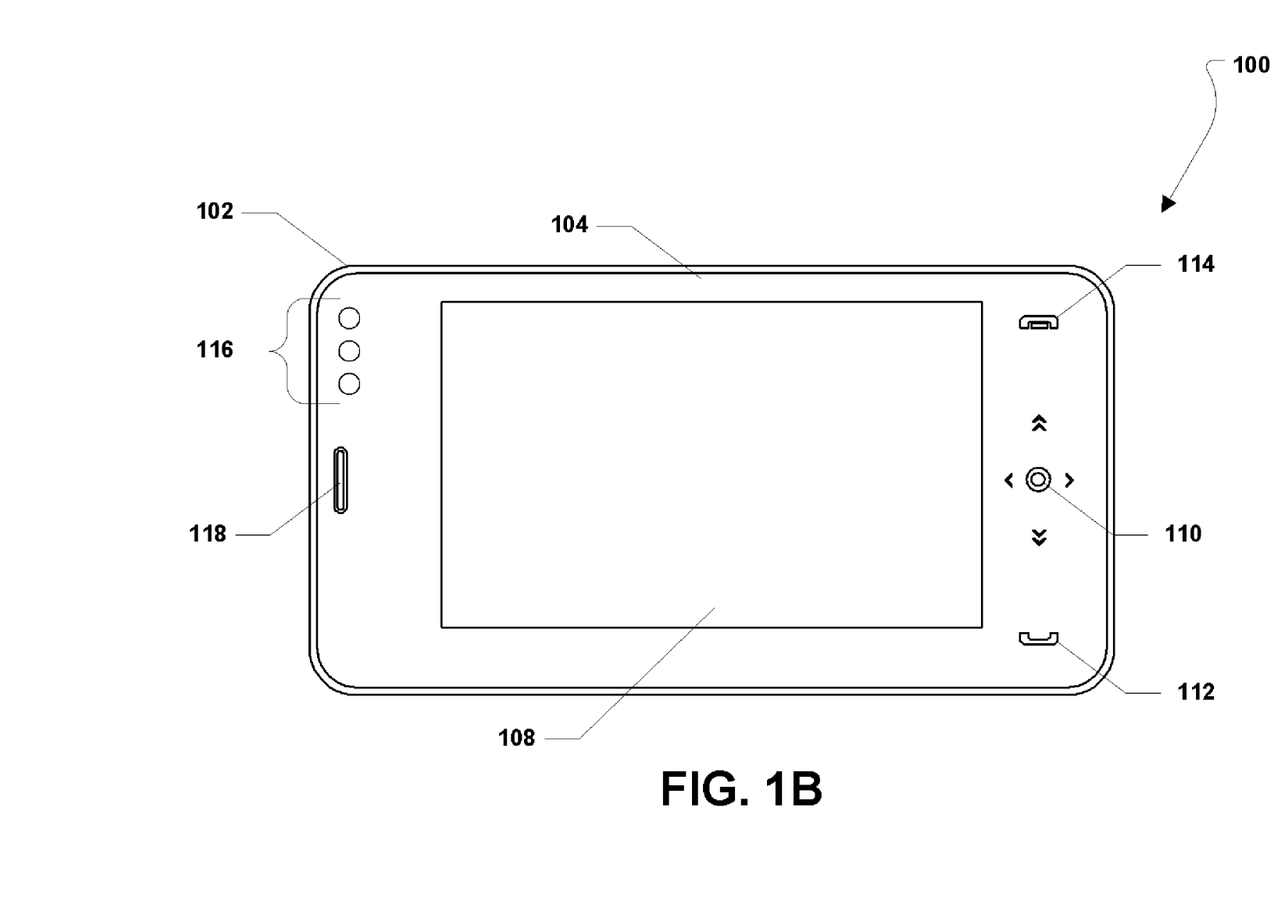
FIG. 1B is a front plan view of a first aspect of a portable computing device (PCD) in a closed position.
Figure 1C:
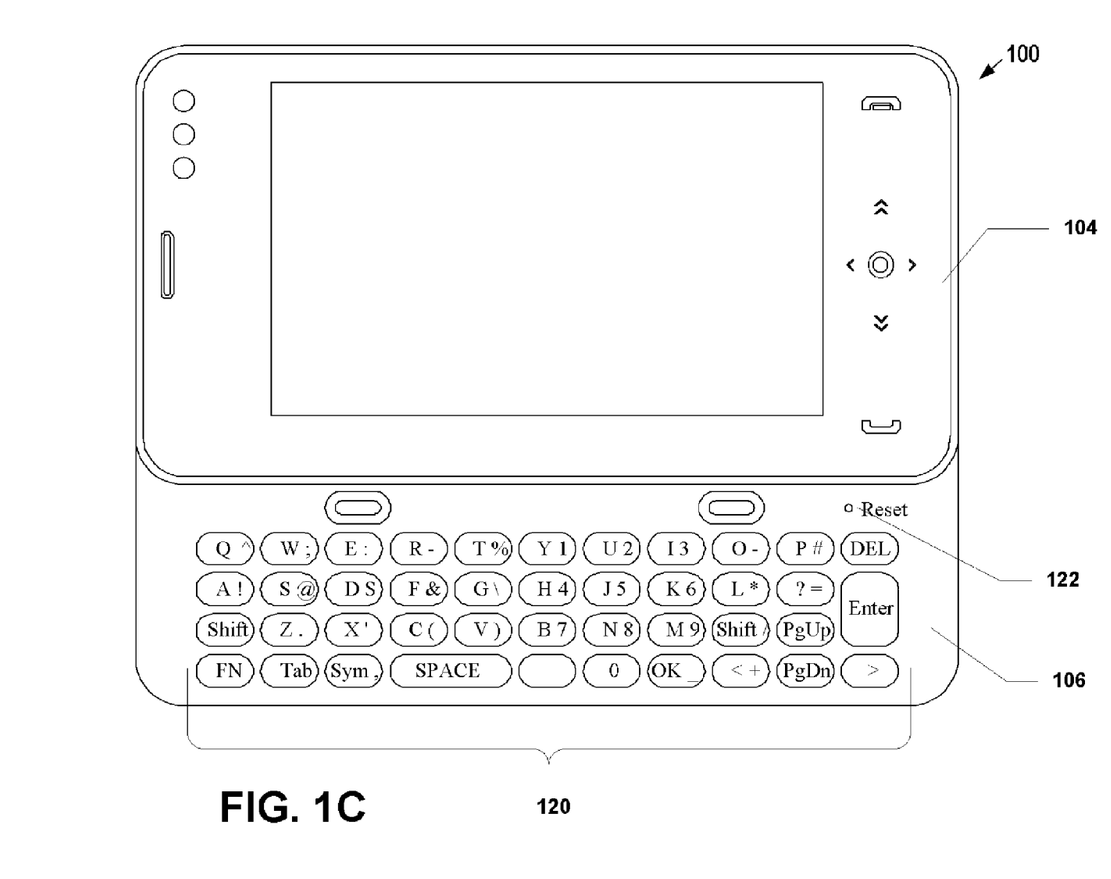
FIG. 1C is a front plan view of the first aspect of a PCD in an open position.

Referring to FIG. 1B and FIG. 1C, an exemplary portable computing device (PCD) is shown and is generally designated 100. As shown, the PCD 100 may include a housing 102. The housing 102 may include an upper housing portion 104 and a lower housing portion 106. FIG. 1A shows that the upper housing portion 104 may include a display 108. In a particular aspect, the display 108 may be a touch screen display. The upper housing portion 104 may also include a trackball input device 110. Further, as shown in FIG. 1A, the upper housing portion 104 may include a power on button 112 and a power off button 114. As shown in FIG. 1A, the upper housing portion 104 of the PCD 100 may include a plurality of indicator lights 116 and a speaker 118. Each indicator light 116 may be a light emitting diode (LED).

In a particular aspect, as depicted in FIG. 1B, the upper housing portion 104 is movable relative to the lower housing portion 106. Specifically, the upper housing portion 104 may be slidable relative to the lower housing portion 106. As shown in FIG. 1B, the lower housing portion 106 may include a multi-button keyboard 120. In a particular aspect, the multi-button keyboard 120 may be a standard QWERTY keyboard. The multi-button keyboard 120 may be revealed when the upper housing portion 104 is moved relative to the lower housing portion 106. FIG. 1B further illustrates that the PCD 100 may include a reset button 122 on the lower housing portion 106.

Figure 2:
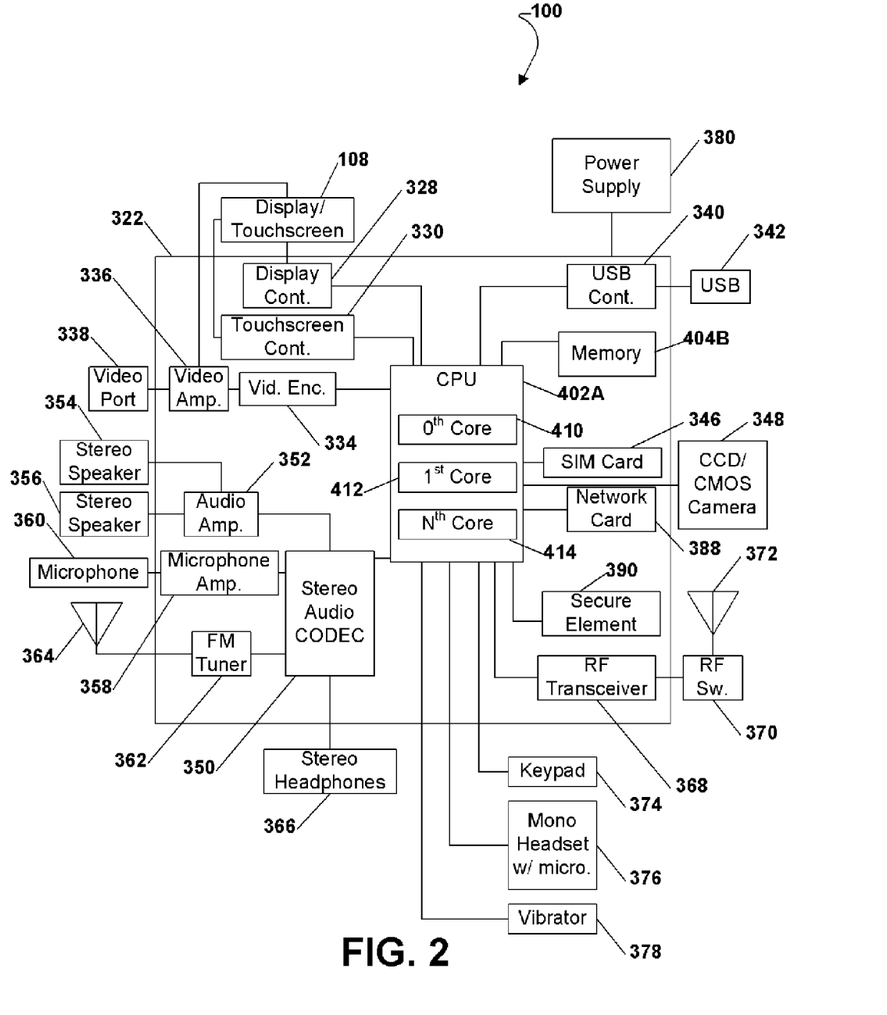
FIG. 2 is a block diagram of a second aspect of a PCD.

Referring to FIG. 2, an exemplary, non-limiting aspect of a portable computing device (PCD) is shown and is generally designated 100. As shown, the PCD 100 includes an on-chip system 322 that includes a multicore CPU 402. The multicore CPU 402 may include a zeroth core 410, a first core 412, and an Nth core 414.

As illustrated in FIG. 2, a display controller 328 and a touch screen controller 330 are coupled to the multicore CPU 402. In turn, a touch screen display 108 external to the on-chip system 322 is coupled to the display controller 328 and the touch screen controller 330.

FIG. 2 further shows that a video encoder 334, e.g., a phase alternating line (PAL) encoder, a sequential color a memoire (SECANT) encoder, or a national television system(s) committee (NTSC) encoder, is coupled to the multicore CPU 402. Further, a video amplifier 336 is coupled to the video encoder 334 and the touch screen display 108. Also, a video port 338 is coupled to the video amplifier 336. As shown in FIG. 2, a universal serial bus (USB) controller 340 is coupled to the multicore CPU 402. Also, a USB port 342 is coupled to the USB controller 340. Memory 404B and a subscriber identity module (SIM) card 346 may also be coupled to the multicore CPU 402.

Further, as shown in FIG. 2, a digital camera 348 may be coupled to the multicore CPU 402. In an exemplary aspect, the digital camera 348 is a charge-coupled device (CCD) camera or a complementary metal-oxide semiconductor (CMOS) camera.

As further illustrated in FIG. 2, a stereo audio coder-decoder (CODEC) 350 may be coupled to the multicore CPU 402. Moreover, an audio amplifier 352 may coupled to the stereo audio CODEC 350. In an exemplary aspect, a first stereo speaker 354 and a second stereo speaker 356 are coupled to the audio amplifier 352. FIG. 2 shows that a microphone amplifier 358 may be also coupled to the stereo audio CODEC 350. Additionally, a microphone 360 may be coupled to the microphone amplifier 358. In a particular aspect, a frequency modulation (FM) radio tuner 362 may be coupled to the stereo audio CODEC 350. Also, an FM antenna 364 is coupled to the FM radio tuner 362. Further, stereo headphones 366 may be coupled to the stereo audio CODEC 350.

FIG. 2 further illustrates that a radio frequency (RF) transceiver 368 may be coupled to the multicore CPU 402. An RF switch 370 may be coupled to the RF transceiver 368 and an RF antenna 372. As shown in FIG. 2, a keypad 374 may be coupled to the multicore CPU 402. Also, a mono headset with a microphone 376 may be coupled to the multicore CPU 402. Further, a vibrator device 378 may be coupled to the multicore CPU 402. FIG. 2 also shows that a power supply 380 may be coupled to the on-chip system 322. In a particular aspect, the power supply 380 is a direct current (DC) power supply that provides power to the various components of the PCD 100 that require power. Further, in a particular aspect, the power supply is a rechargeable DC battery or a DC power supply that is derived from an alternating current (AC) to DC transformer that is connected to an AC power source.

FIG. 2 further indicates that the PCD 100 may also include a network card 388 that may be used to access a data network, e.g., a local area network, a personal area network, or any other network. The network card 388 may be a Bluetooth network card, a WiFi network card, a personal area network (PAN) card, a personal area network ultra-low-power technology (PeANUT) network card, or any other network card well known in the art. Further, the network card 388 may be incorporated into a chip, i.e., the network card 388 may be a full solution in a chip, and may not be a separate network card 388.

As depicted in FIG. 2, the touch screen display 108, the video port 338, the USB port 342, the camera 348, the first stereo speaker 354, the second stereo speaker 356, the microphone 360, the FM antenna 364, the stereo headphones 366, the RF switch 370, the RF antenna 372, the keypad 374, the mono headset 376, the vibrator 378, and the power supply 380 are external to the on-chip system 322.

FIG. 2 further illustrates a secure element 390 that is coupled to the multicore CPU 402A. The secure element 390 may comprise an integrated circuit (IC) or chip that is typically found on/in smart cards or integrated circuit (IC) cards. Further details of the secure element 390 will be described below in connection with FIG. 3.

In a particular aspect, one or more of the method steps described herein may be stored in the memory 404A or the secure element 390 (or both) as computer program instructions. These instructions may be executed by the multicore CPU 402 or the secure element 390 (or both) in order to perform the methods described herein. Further, the multicore CPU 402, the memory 404, the secure element 390, or a combination thereof may serve as a means for executing one or more of the method steps described herein.

Figure 3:
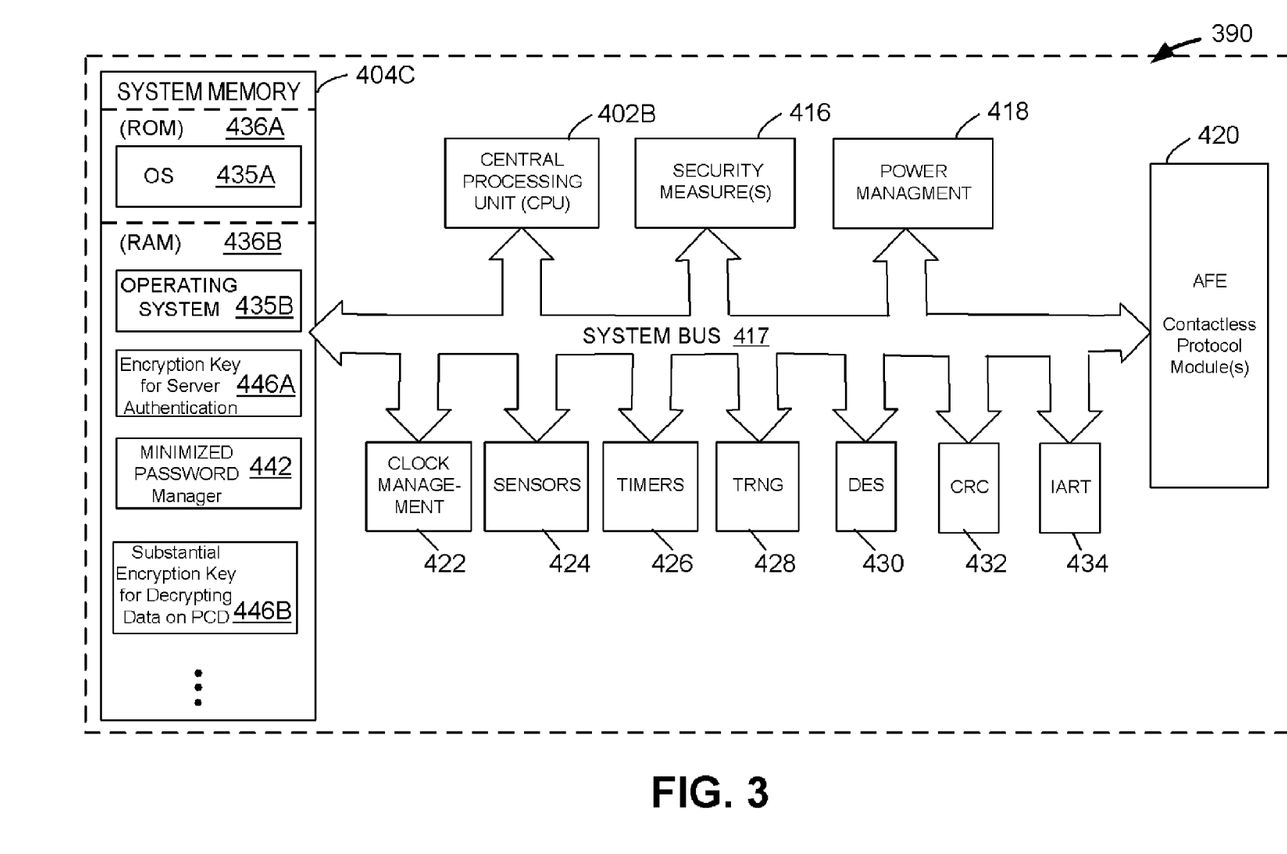
FIG. 3 is a block diagram of a processing system for a secure element contained within the PCD.

FIG. 3 is a block diagram of a processing system for a secure element contained 390 within the PCD 100. The secure element 390 may comprise an integrated circuit (IC) or chip that is typically found on/in smart cards or integrated circuit (IC) cards. The secure element 390 may comprise a contact based IC or a contactless based IC. As understood by one of ordinary skill in the art, a contact based IC typically requires a physical connection, via electrical contacts, between the IC circuit and a reader/another IC. A contactless based IC utilizes wireless communications such as near-field RF communications between the IC circuit and a reader/another IC. According to one preferred and exemplary embodiment, the secure element 390 comprises a contactless based IC as understood by one of ordinary skill in the art.

The secure element 390 may comprise an analog front end (AFE) that includes one or more contactless protocol module(s) 420 as understood by one of ordinary skill in the art. Exemplary contactless protocols supported by the one or modules 420 include, but are not limited to, Standard European Computer Manufacturers Association (ECMA) 340, Near Field Communication Interface and Protocol (NFCIP-1), ISO (the International Organization for Standardization) and IEC (the International Electrotechnical Commission) Standards 14443A, 14443B, 15963, and 18000, and other like contactless protocols. With these protocols, the secure element 390 may support one or more modes of operation that include, but are not limited to, a card emulation mode, a reader mode, and a peer-to-peer communication mode.

The analog front end (AFE) 420 comprising the contactless protocol modules may be coupled to a system bus 417. The system bus 417 may have several other components coupled to it: a memory 404B, a central processing unit 402B, security measures for 416, a power management module 418, a clock management module 422, sensors 424, timers 426, a true random number generator (TRNG) 428, a hardware data encryption standard (DES) accelerator 430, an ISO/IEC Standard 3309 cyclic redundancy check (CRC) module 432, and an instruction address register (IAR) 434. Additional or fewer modules than those illustrated in FIG. 3 may be employed without departing from the scope of the invention as understood by one of ordinary skill the art.

The Data Encryption Standard (DES) module 430 may perform the calculation of DES and triple DES algorithms. The cyclical redundancy check (CRC) module 432 verifies data integrity by checking the data to see whether an error has occurred during transmission, reading, or writing. CRC calculations are standardized in the protocol layer; ISO/IEC 7816 for contact smart cards, and ISO/IEC 14443 for contactless smart cards.

The high quality, true random number generator (TANG) 428 may be the basis of many cryptographic protocols and is also used in conjunction with software to harden cryptography against Differential Power Analysis (DPA) and Simple Power Analysis (SPA). The TANG 428 can be used to create randomly different and false wait states that confuse the attacker when they are attempting to analyze the power consumption of the chip. High quality random numbers protect keys when appropriately used in mutual authentication and encryption. In these applications, random numbers are encrypted, exchanged and then eventually used as the basis of session keys guarding transactions. True random numbers are not feasibly guessed by attackers and therefore maximize the strength of the cryptography used.

The power management unit 418 may scramble current consumption by performing dummy access operations in memory. As a result of scrambling, the current consumption of the actual program flow is hidden. When used in conjunction with the TRNG 428 and random wait states, this feature is a powerful countermeasure against power analysis of the secure element 390.

The OS 435A may be embedded in the secure element's non-volatile memory (such as ROM) 436A during the manufacturing process. The OS 435A may not only define program operations for IC applications, it may also include software security features to counter software attacks and enhance the security features noted above.

The memory 404B of the secure element 390 may comprise a volatile component as well as a non-volatile component. The non-volatile component may comprise read only memory (ROM) 436A. The ROM 436A may store the operating system (OS) for the secure element 390 which may be executed by the central processing unit 402B and/or firmware as understood by one of ordinary skill in the art.

The volatile component for the memory 404B of the secure element 390 may comprise random access memory (RAM) 436B. The volatile memory component for the secure element may incorporate other different memory technologies, such as, but not limited to, erasable programmable read-only memory (EPROM) or electrically erasable programmable read-only memory (EEPROM), and/or flash memory and ferroelectric random access memory (FRAM).

The RAM 436B may also comprise an operating system for 435B as well as one or more application programs, such as, a first substantial encryption key 446A for server authentication, a secure channel manager module 442, and a second substantial encryption key 446B for decrypting secure data on the PCD 100.

The first substantial encryption key 446A used for authenticating the PCD 100 to a server 210 may comprise a symmetric key or an asymmetric key. A key, as understood by one of ordinary skill in the art, is a piece of information (a parameter) that determines the functional output of a cryptographic algorithm or cipher. Without a key, a cryptographic algorithm would typically have no result. In encryption, a key specifies the particular transformation of plaintext into ciphertext, or vice versa during decryption as understood by one of ordinary skill in the art. If the substantial encryption key 446A comprises an asymmetric key, then its minimum size may comprise 1024 Bits. However, asymmetric keys of greater sizes are within the scope of the invention. Greater sizes for symmetric keys include, but are not limited to, 2048 Bits, and 3072 Bits, and greater.

Any one of a number of cryptography algorithms may be employed with the secure element 390 without departing from the invention. The secure element 390 may employ a public-key encryption algorithm: such an algorithm does not require a secure initial exchange of one or more secret keys to both sender and receiver. Public-key algorithms are asymmetric key algorithms as understood by one of ordinary skill in the art.

One exemplary public-key cryptography algorithm which may be employed by the secure element 390 and uses asymmetric keys is RSA (Rivest, Shamir and Adleman). Another exemplary public-key cryptography algorithm is Elliptic curve cryptography (ECC). Another exemplary algorithm which may be employed is the Digital Signature Algorithm (DSA) as understood by one of ordinary skill in the art.

Asymmetric key algorithms, as understood by one of ordinary skill in the art, are used to create a mathematically related key pair: a secret private key and a published public key. Use of these keys allows protection of the authenticity of a message by creating a digital signature of a message using the private key, which may be verified using the public key. It also allows protection of the confidentiality and integrity of a message, by public key encryption, encrypting the message using the public key, which may only be decrypted using the private key.

However, the secure element 390 may also employ symmetric-key algorithms. Symmetric-key algorithms are a class of algorithms for cryptography that use trivially related, often identical, cryptographic keys for both decryption and encryption. Exemplary sizes for substantial encryption keys 446A for symmetric-key algorithms used for authenticating the PCD 100 to a server 210 include, but are not limited to, sizes of 80 bits, 112 bits, 128 bits, 256 bits, and greater. Exemplary symmetric-key algorithms include, but are not limited to, the Data Encryption Standard (DES), Triple DES, and the Advanced Encryption Standard (AES).

The first substantial encryption key 446A for server authentication may be the same key or a different key relative to the second substantial encryption key 446B for decrypting local data stored on the PCD 100. If the keys 446A, 446B are different, then their respective sizes and types may be also different. For example, the first encryption key 446A for server authentication may comprise an asymmetric key while the second encryption key 446B for decrypting local data stored on the PCD 100 may comprise a symmetric key, and vice-versa. Alternatively, the substantial encryption keys 446A, 446B could be of the same type but may have different respective sizes. Various combinations of different or similar keys 446A, 446B are within the scope of the invention and understood by one of ordinary skill in the art.

The secure channel manager module 442 may comprise an application program or module which receives and manages encrypted secure channel keys that are sent by the SE communication application program 450 of the base band processor 402A.

To access the encrypted secure channel keys, a personal identification number (PIN) in combination with a password based encryption (PBE) algorithm may be managed by the PBE Algorithm application 444 that is executed by the base-band processor 402A. An exemplary short PIN-length as of this writing may comprise four characters. However, other lengths for the PIN are within the scope of the invention. The secure element 390 is able to support relatively short PIN lengths because of the security measures 416 which are present within the secure element 390. Such security measures may be employed by the secure element 390, and specifically the secure channel manager 442, only after a few unsuccessful attempts to establish a secure communication channel between the SE Communication application 450 and the Secure Channel Manager 442. An unsuccessful attempt would include an instance when the wrong PIN is entered and does not unlock the encrypted secure channel keys contained within or accessible by the PBE algorithm 444. The security measures 416 employed by the secure channel manager 442 may comprise permanent disablement of at least one of memory and the operating system of the secure element 390 as understood by one of ordinary skill in the art.

Additional security measures for the secure element 390 executed by the secure channel manager 442 may include external clock frequency and voltage monitoring. Memory access rights of the secure element 390 may be controlled by the memory management and protection unit that is part of the security measure(s) block 416. An active shield layer of the secure element 390 may detect attempts to probe or force internal components or signal lines. Specifically, the secure element 390 may comprise a programmable active shield which covers the entire secure element 390 and is equipped with signal layers that detect attempts to probe or force internal modules or signal lines. Random generation of current noise on idle buses (bus confusion) may be generated to protect against attackers who analyze the bus 417. When someone tries to analyze the secure element 390 with various techniques, several built-in sensors may be activated and trigger a special security reset, which immediately overwrites the RAM area. A functional current scrambling engine, in conjunction with the true random number generator 428 and random wait state feature, may protect against power and timing analyses of the secure element 390.

Other security measures for the secure element 390 may include, but are not limited to, random wait state insertion; bus confusion and memory encryption; continuous check of random characteristics; current scrambling/stabilizing; voltage regulation; dual bus rails, where the transmission of data is passed from one rail of the bus to the other to confuse the attacker; use of a memory management unit to prohibit one application from accessing the code of another application; active shielding that renders the IC inactive when triggered; small IC geometry (approximately less than or equal to 0.22 micro-meter as a maximum feature size) to deter microprobing; continuous checking of the random characteristics of the IC; unique timing and a unique IC physical layout.

Some sensors that may be built into the secure element 390 to thwart fault or invasive attacks may include, but are not limited to, the following: low and high frequency sensors for the internal clock; sensors and filters for the external clock; external high and low voltage sensors; internal voltage sensors; temperature sensors; peak voltage sensors; glitch sensors on internal voltage; and light sensors on the IC surface.

The security measures 416 may be activated when a threshold number of unsuccessful secure channel initiations have been made or when an attack is sensed by one of the sensors noted above. The threshold number of unsuccessful secure channel initiations is usually set at a low number in order to make the secure element 390 safe against attacks and unauthorized uses of the PCD 100. For example, exemplary thresholds may comprise an order of three, four, five, or six attempts which may be permitted to enter a valid PIN that is used as a key to a password based encryption (PBE) algorithm. The PBE algorithm is used to decrypt cryptographic keys needed to establish a secure communication channel and managed by the secure channel manager module 442. After the exemplary threshold of attempts has been exceeded, any one of the security measures 416 may be activated.

According to one exemplary embodiment, when the security measures 416 are activated, they are typically permanent in nature. This means that the secure element 390 is permanently deactivated and unable to process any further data. This also means that there is usually no way to reset the secure element 390. Because of this permanent deactivation of the secure element 390, another PCD 100 may need to be obtained, and in many cases, purchased by the consumer/user.

A PBE which has a non-padded cipher is used to establish the secure communication channel 448 of FIG. 4, discussed below. Specifically, the PBE using the nonpadded cipher is just used to encrypt/decrypt the secure channel keys that will then be used to establish the secure communication channel 448. As understood to one of ordinary skill in the art, block cipher algorithms like the Data Encryption Standard (DES) and Blowfish in Electronic Code Book (ECB) and Cipher Block Chaining (CBC) mode require their input to be an exact multiple of the block size. If the plain text to be encrypted is not an exact multiple, padding may be required before encrypting by adding a padding string. When decrypting, the receiving party usually needs to know how to remove the padding in an unambiguous manner. To increase security for establishing the secure communication channel 448 between the secure element 390 and the baseband CPU 402A, a password based encryption (PBE) encryption algorithm or cipher which does not utilize any padding is employed.

As noted previously, the secure element 390 in addition to providing enhanced security for locally stored encrypted data within the PCD 100 may also have its normal contactless smart card functionality. In other words, the secure element 390 may also support financial transactions such as being used for exchanging money or funds for purchases when the PCD 100 is presented to a reader 265 coupled to a point of sale terminal 267, as illustrated in FIG. 1C. The secure element 390 may comprise a contact interface and a contactless interface. Such a secure element 390 may support both ISO/IEC 7816 and ISO/IEC 14443 protocols to communicate with the reader 265.

Figure 4:
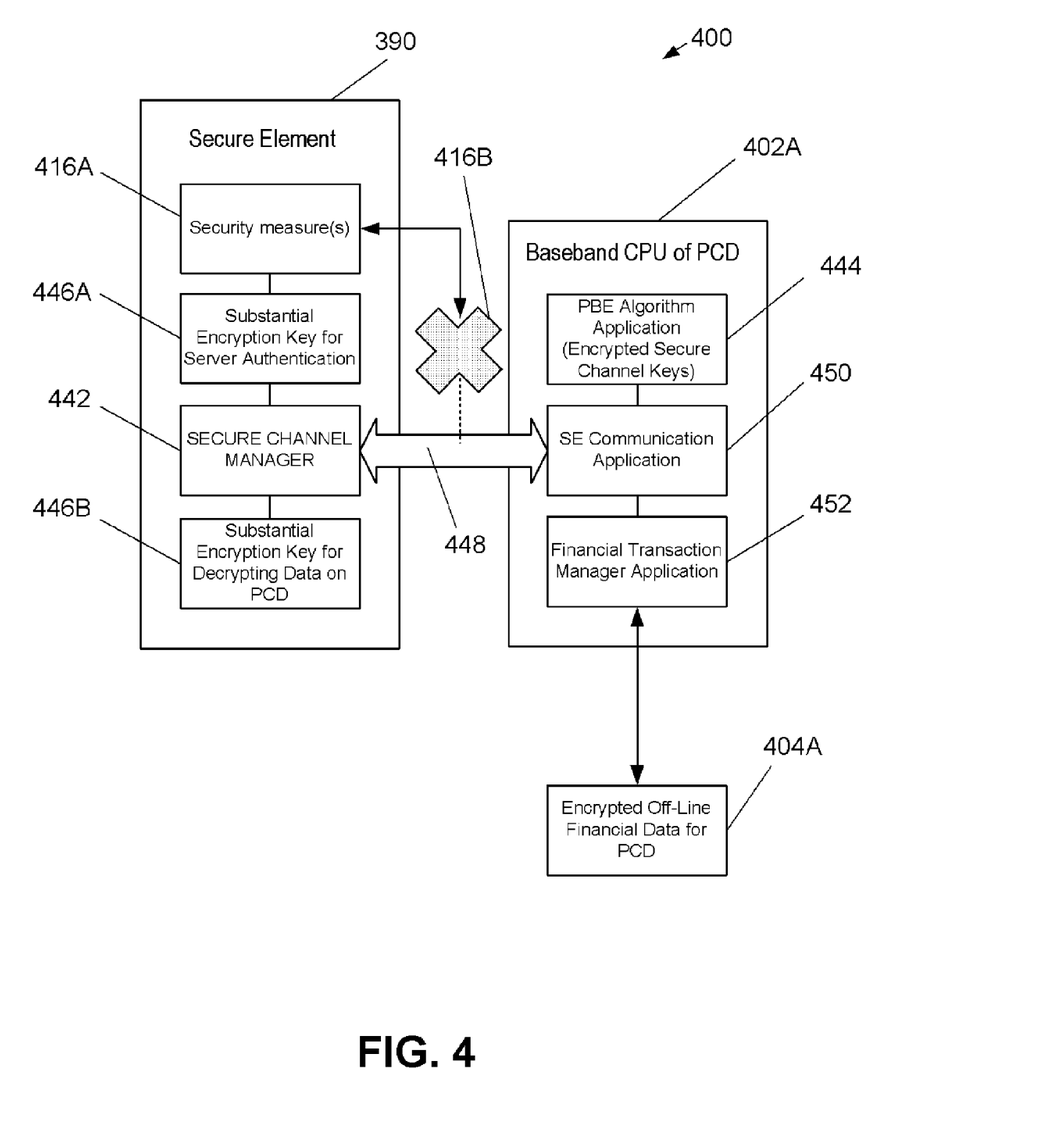
FIG. 4 is a block diagram of an exemplary software architecture for the PCD.

FIG. 4 is a block diagram of an exemplary software architecture 400 for the PCD 100. As illustrated in the software architecture 400 of FIG. 4, the baseband CPU 402A of the PCD 100 is establishing a secure communications channel 448 with the secure element 390. As noted previously in FIG. 3, the secure element 390 may comprise various program modules that include, but are not limited to, security measures 416A, a substantial encryption key 446A for server authentication, the secure channel manager module 442, and a substantial encryption key 446B for decrypting data in the PCD 100.

The security measures module 416A may activate one or more actual security measures 416B if a predetermined number of attempts for entering the PIN or password has been exceeded as described above in connection with FIG. 3. These security measures 416B have been illustrated with "X"-shaped element to indicate that the measures 416B may cut off or eliminate the communication channel 448 between the secure element 390 and baseband CPU 402A of the PCD 100 if the wrong PIN or password has been entered above the predetermined, permitted amounts.

The baseband CPU 402A of the PCD 100 may execute or run one or more program modules that may include, but are not limited to, a password based encryption (PBE) module 444, a secure element communication application or module 450, and a financial transaction manager application or module 452. The PBE module 444 takes the password or PIN entered by a user into the SE communication module 450 and uses the PIN to decrypt the secure channel keys that will then be used to establish the secure communication channel 448 with the secure channel manager module 442 of the secure element 390. The secure channel manager module 442 of the secure element 390 receives the secure channel keys from the baseband processor's PBE module 444 in order establish the secure communication channel 448.

The PBE module 444 functions to help establish secure communications between the secure element 390 and the baseband CPU 402A so that unauthorized users and/or programs cannot access the PIN that is used to decrypt cryptographic keys, in which only the cryptographic keys are sent between the CPU 402A and the secure element 390. The PBE module 444 may execute or run one or more PBE algorithms known as of this writing. Such PBE algorithms include, but are not limited to, various standards, such as PKCS #5 developed by RSA Laboratories, as understood by one of ordinary skill in the art.

If the secure channel manager module 442 determines that a secure communication channel has been established correctly, then the secure channel manager module 442 will permit access to the substantial encryption key 446B for decrypting any data that is stored locally on the PCD 100. Specifically, once the secure channel manager module 442 verifies that a secure communication channel has been established correctly using the PBE algorithm discussed above, then the secure channel manager module 442 may prompt the baseband CPU 402A and specifically the SE communication application 450, to send over any encrypted off-line financial data over the secure communication channel 448 that may be stored in memory 404A. When any encrypted data is received by the substantial encryption key 446B module, it may decrypt the data and transmitted over the secure communication channel 448.

The SE communication module 450 may work with other modules, such as a financial transaction manager module 452, in order to retrieve any encrypted off-line data such as financial data for transmission over the secure communications channel 448. The SE communication module 450 may comprise a separate application/module or it may be part of various modules such as the financial transaction manager module 452, as understood by one of ordinary skill in the art.

Once the secure communication channel is established between the baseband CPU 402A and the secure element 390, the secure channel manager module 442 may also prompt or request if the SE communication module 450 desires to establish a secure communication channel with a server 210. If the SE communication module 450 desires to establish a secure communication channel with the server 210, then the secure element 390 may initiate communications with the server 210 utilizing the substantial encryption key 446A for server authentication.

Figure 5:
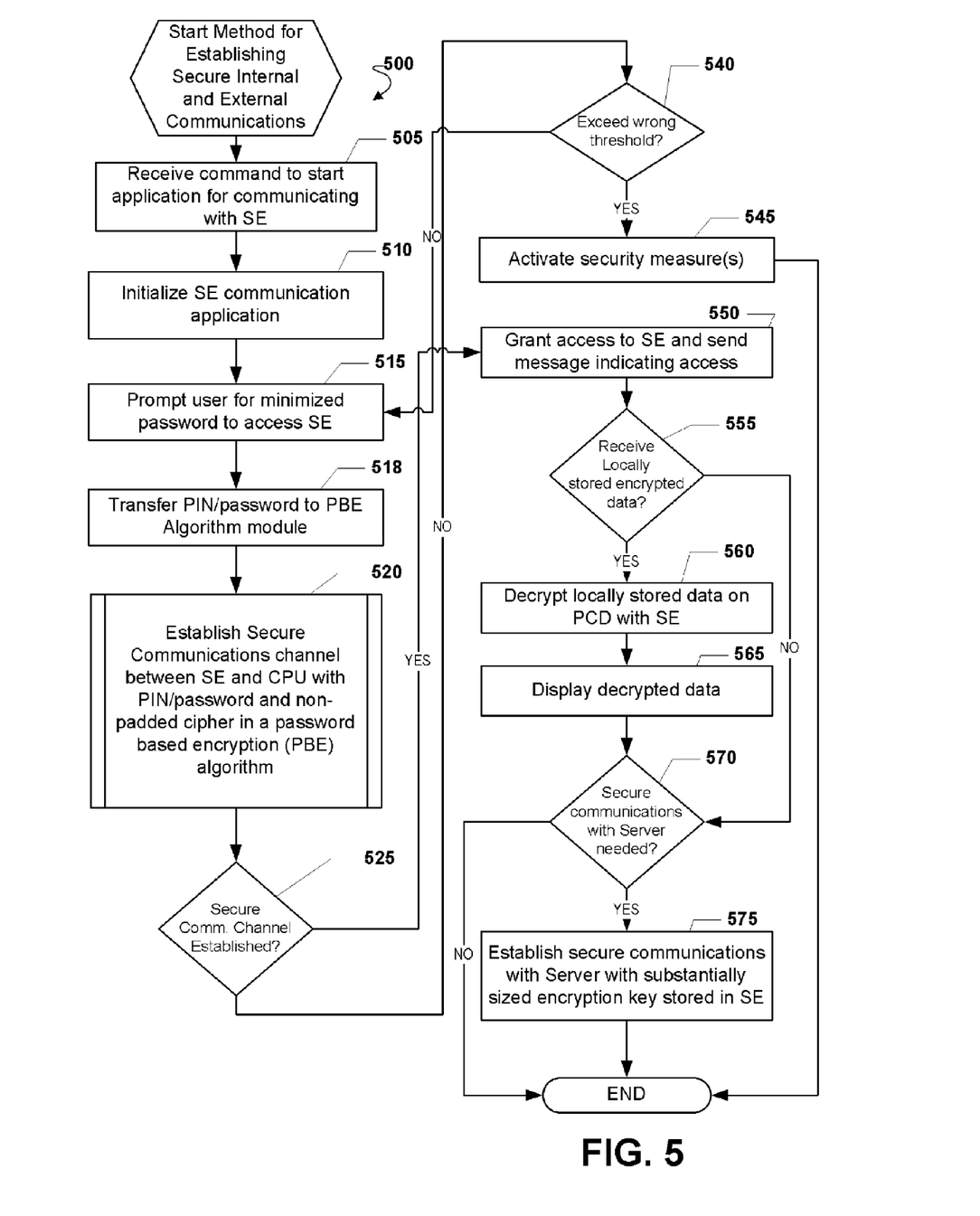
FIG. 5 is a flowchart illustrating a method for managing secure information within a PCD.

FIG. 5 is a flowchart illustrating a method 500 for managing secure information within a PCD 100. Block 505 is the first step in the process 500 for managing secure information within the PCD 100. In block 505, the baseband CPU 402A receives a command to start the program application or module 444 for communicating with the secure element 390. As noted previously, the SE communication module 450 may be a separate application or it may be part of a piece of software or firmware such as the financial transaction manager application 452 as illustrated in FIG. 4.

In block 510, the baseband CPU 402 initializes the SE communication module 450. Next, in block 515, the SE communication module 450 prompts a user to enter a minimized password to access the secure element 390. As noted above, a minimized password is typically a personal identification number (PIN) with a relatively short amount of characters such as on the order of four, five, or six characters which can be easily remembered by an authorized user of the PCD 100. As explained above, a minimized password or PIN may be used because of the security measures 416A, B which may be activated after a low threshold or low number of wrong attempts to enter the right password.

In block 518, the minimized password or PIN is passed from the secure communication application module 450 to the PBE Algorithm application 444 which is executed by the baseband CPU 402A as illustrated in FIG. 4.

Next, in routine 520, the secure element communication module 450 uses the PBE Algorithm module 444 with the minimized password or PIN to decrypt the cryptographic keys stored in the baseband persistent storage. The secure element communication module 450 will use those keys (typically a set of 3 keys) to establish the secure communication channel 448 with the SE 390.

It is important for the PBE algorithm of module 444 to use a non-padded cipher when encrypting the crypto keys used to establish the secure channel 448, because this does not introduce a pattern to the data. These crypto keys are typically symmetric keys that may comprise one large random number. An attacker decrypting the symmetric key would only be able to tell if they were successful by trying to establish a secure channel 448 with the SE 390, which would lock them out after three bad attempts.

If there was a way for the attacker to tell whether they had successfully decrypted the symmetric key without talking to the SE 390, then they could launch a brute force offline attack against the key. The reason the attacker has to talk to the SE 390 is because when they decrypt the symmetric key the result is just a random number. Usually, an attacker cannot tell one random number from another, so they have to check them with the SE 390. However, if a padding cipher is utilized, this introduces a pattern to the data. Only certain PINs (probably only one, the actual user PIN) would decrypt the symmetric key in such a way as to produce the correct padding sequence in the data. So if a padding cipher is used, it may introduce the ability for the attacker to tell whether they have successfully decrypted the symmetric key without having to talk to the SE 390. Thus, as described above, a non-padded cipher is used by the PBE algorithm module 444. Further details of routine 520 will be described below in connection with FIG. 6.

After routine 520, in decision block 525, the secure channel manager module 442 may determine if a secure communication channel 448 has been established between the secure element 390 and the baseband CPU 402A. If the inquiry to decision block 525 is negative, then the "No" branch is followed to decision block 540. If the inquiry to decision block 525 is positive, then the "Yes" branch is followed to block 550.

In decision block 540, the secure channel module 450 determines if a predetermined number of attempts to establish a secure communication channel 448 has been exceeded. As described previously, the number of attempts is generally kept relatively low which increases the level of security for the secure element 390. For example, a predetermined number of attempts permitted by the secure channel manager module 442 may comprise fewer than ten attempts, such as on the order of four, five, or six attempts to access the secure element 390.

If the inquiry to decision block 540 is negative, then the "No" branch is followed back to block 515 which allows for further attempts at entering the PIN or password. If the inquiry to decision block 540 is positive meaning that the threshold number of attempts has been exceeded, then the "YES" branch is followed to block 545 in which the security measures module 416A activates the security measures 416B as illustrated in FIG. 4.

As noted above, if the security measures 416B are activated, then generally the secure element 390 is rendered inoperable and in a permanent, and unrepairable state. With the secure element 390 in such a unrepairable state, it would be impossible for any unauthorized user to gain access to the encrypted off-line financial data stored in the memory device 404A as illustrated in FIG. 4. Access could not be achieved in this scenario because the substantial encryption key 446B for decrypting the encrypted off-line financial data would not be operable.

In block 550 via decision block 525, the secure channel manager 442 may grant access to the functions and operations of the secure element 390 and the secure element 390 may send a message to the baseband CPU 402A indicating this access. One of the main functions of the secure element 390 may be to decrypt any encrypted off-line financial data stored in the memory device 404A as illustrated in FIG. 4.

In decision block 555, the secure channel manager 442 may determine if it has received any locally stored into the data, such as the encrypted off-line financial data stored in the memory element 404A. If the inquiry to decision block 555 is negative, then the "No" branch is followed to decision block 570. If the inquiry to decision block 555 is positive, then the "Yes" branch is followed to block 560 in which the substantial encryption key 446B may be used to decrypt any of the received locally stored encrypted data. In block 565, the decrypted data may be displayed to the user on the display device 108 of FIG. 1B.

In decision block 570, the secure channel manager 442 may determine if the baseband CPU 402A desires to communicate with a server 210, such as for conducting financial transactions utilizing the server 210 in combination with the PCD 100. If the inquiry to decision block 570 is negative, then the "No" branch is followed and the process ends. If the inquiry to decision block 570 is positive, then the "Yes" branch is followed to block 575 in which the secure channel manager 442 utilizes the substantial encryption key 446A for server authentication in order to establish a secure communication channel over the communications link 103B as illustrated in FIG. 1C. As described previously, the secure element 390 may utilize substantial encryption keys 446A having sizes on the order of 1024 Bits or more for asymmetric type encryption keys.

Figure 6:
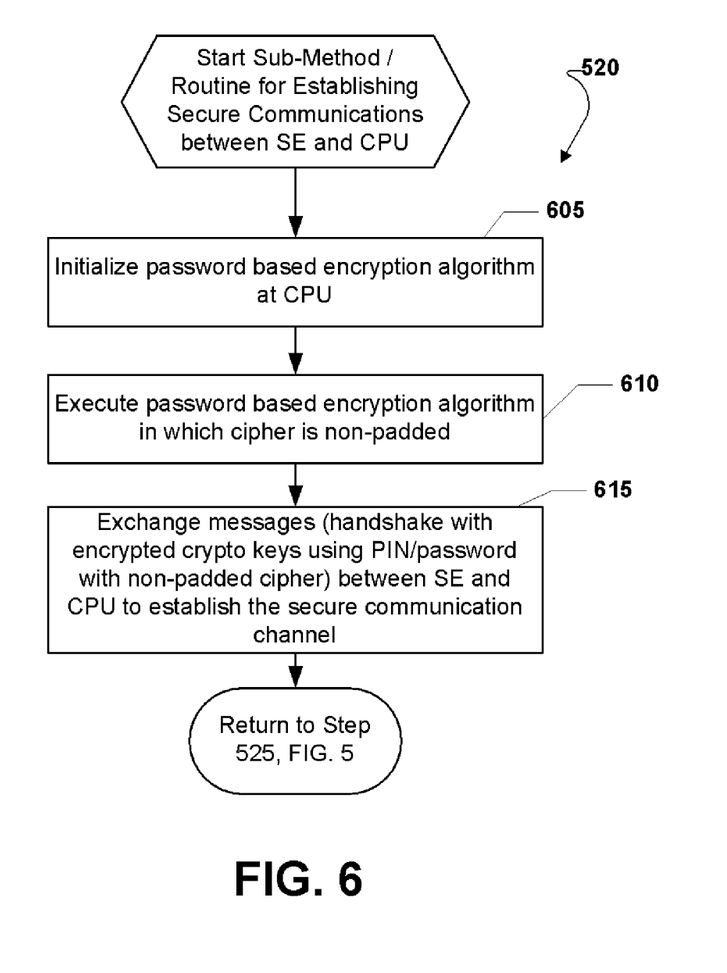
FIG. 6 is a flowchart illustrating a sub-method or a routine of FIG. 5 for establishing secure communications between a baseband central processing unit and a secure element of PCD.

FIG. 6 is a flowchart illustrating a sub-method or a routine 520 of FIG. 5 for establishing secure communications between a baseband central processing unit 402A and a secure element 390 of PCD 100. Block 605 is the first step in the routine 520 for initializing the password based encryption (PBE) algorithm module 444 of the CPU 402A. Next, in block 610, the CPU 402A may execute the instructions within the PBE algorithm module 444 utilizing a cipher which is non-padded. In other words, to increase security for establishing the secure channel 448 between the secure element 390 and the baseband CPU 402A, a password based encryption (PBE) encryption algorithm or cipher which does not utilize any padding is employed. The PBE Algorithm module 444 (in connection with the minimized password or PIN) to decrypt cryptographic keys stored in the baseband persistent storage. The secure element communication module 450 will use those keys (typically a set of 3 keys) to establish the secure channel 448 with the SE 390.

As noted previously, a non-padded cipher is used to encrypt the crypto keys in order to establish the secure channel 448, because this does not introduce a pattern to the data. These crypto keys are typically symmetric keys that may comprise one large random number.

Next, in block 615, messages utilizing the decrypted crypto keys derived from the non-padded cipher may be exchanged between the secure element 390 and the CPU 402A in order to establish the secure channel 448. The process then returns to decision block 525 of FIG. 5.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter", "then", "next", etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example.

Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the Figures which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Although selected aspects have been illustrated and described in detail, it will be understood that various substitutions and alterations may be made therein without departing from the spirit and scope of the present invention, as defined by the following claims.

What is claimed is:

1. A method for managing secure information within a portable computing device by selective establishment of a secure communication channel within the portable computing device, the method comprising:
    initializing a program module of a central processing unit of the portable computing device for communicating with a secure element of the portable computing device;
    receiving a password at the central processing unit of the portable computing device for gaining access to the secure element of the portable computing device;
    initializing a password based encryption algorithm with the password, wherein:
        if the password is correct, initializing the password based encryption algorithm with the password generates a correct series of cryptographic keys; and
        if the password is incorrect, initializing the password based encryption algorithm with the password generates an incorrect series of cryptographic keys;
    exchanging messages between the central processing unit of the portable computing device and the secure element of the portable computing device using the generated series of cryptographic keys to request that a secure communication channel be established between the secure element of the portable computing device and the central processing unit of the portable computing device, wherein:
        if the generated series of cryptographic keys is correct, the secure communication channel is established; and
        if the generated series of cryptographic keys is incorrect, the request to establish the secure communication channel is denied;
    if the generated series of cryptographic keys is incorrect, then determining if a predetermined threshold number of requests to establish a secure communication channel has been achieved; and
    authenticating the portable computing device to a server located remotely from the portable computing device with a first substantial encryption key for server authentication, wherein the first substantial encryption key comprises an asymmetric key having a bit length of greater than or equal to 1024 bits.

2. The method of claim 1, further comprising activating one or more security measures if the predetermined threshold number of requests has been achieved.

3. The method of claim 2, wherein the one or more security measures comprises permanent disablement of the secure element.

4. The method of claim 1, further comprising granting access to the secure element of the portable computing device which comprises at least one of a first substantial encryption key for server authentication with a server located remotely from the portable computing device and a second substantial encryption key for decrypting encrypted data stored locally within the portable computing device.

5. The method of claim 1, wherein the password based encryption algorithm utilizes a non-padded cipher.

6. The method of claim 1, further comprising decrypting encrypted data stored locally within the portable computing device with a second substantial encryption key for decrypting data stored locally.

7. The method of claim 6, wherein the first substantial encryption key comprises a symmetric key having a bit length of greater than or equal to 80 bits.

8. The method of claim 1, wherein the portable computing device comprises at least one of a mobile telephone, a personal digital assistant, a pager, a smartphone, and a hand-held computer with a wireless connection or link.

9. A computer system for managing secure information within a portable computing device via selective establishment of a secure communication channel within the portable computing device, the system comprising:
    a central processing unit of the portable computing device operable to:
        initialize a program module of the portable computing device for communicating with a secure element of the portable computing device;
        initialize a password based encryption algorithm with a received password, wherein:
            if the password is correct, the password based encryption algorithm generates a correct series of cryptographic keys; and
            if the password is incorrect, the password based encryption algorithm generates an incorrect series of cryptographic keys;
        exchange messages with the secure element of the portable computing device using the generated set of cryptographic keys to request that a secure communication channel be established between the secure element of the portable computing device and the central processing unit of the portable computing device, wherein:
            if the generated series of cryptographic keys is correct, the secure communication channel is established; and
            if the generated series of cryptographic keys is incorrect, the request to establish the secure communication channel is denied;
        if the generated series of cryptographic keys is incorrect, then determine if a predetermined threshold number of requests to establish a secure communication channel has been achieved; and
        authenticate the portable computing device to a server located remotely from the portable computing device with a first substantial encryption key for server authentication, wherein the first substantial encryption key comprises an asymmetric key having a bit length of greater than or equal to 1024 bits.

10. The system of claim 9, wherein the central processing unit of the portable computing device is further operable to activate one or more security measures if the predetermined threshold number requests has been achieved.

11. The system of claim 10, wherein the one or more security measures comprises permanent disablement of the secure element.

12. The system of claim 9, wherein the central processing unit is further operable to grant access to the secure element of the portable computing device through the secure communication channel and the secure element of the portable computing device comprises at least one of a first substantial encryption key for server authentication with a server located remotely from the portable computing device and a second substantial encryption key for decrypting encrypted data stored locally within the portable computing device.

13. The system of claim 9, wherein the password based encryption algorithm utilizes a non-padded cipher.

14. The system of claim 9, wherein the processor is further operable to:
    decrypt encrypted data stored locally within the portable computing device with a second substantial encryption key for decrypting data stored locally.

15. The system of claim 14, wherein the first substantial encryption key comprises a symmetric key having a bit length of greater than or equal to 80 bits.

16. The system of claim 9, wherein the portable computing device comprises at least one of a mobile telephone, a personal digital assistant, a pager, a smartphone, a navigation device, and a hand-held computer with a wireless connection or link.

17. A computer system for managing secure information within a portable computing device by selective establishment of a secure communication channel within the portable computing device, the system comprising:
  means for initializing a program module of a central processing unit of the portable computing device for communicating with a secure element of the portable computing device;
  means for receiving a password at the central processing unit of the portable computing device for gaining access to the secure element of the portable computing device;
  means for initializing a password based encryption algorithm with the password, wherein:
    if the password is correct, initializing the password based encryption algorithm with the password generates a correct series of cryptographic keys; and
    if the password is incorrect, initializing the password based encryption algorithm with the password generates an incorrect series of cryptographic keys;
  means for exchanging messages between the central processing unit of the portable computing device and the secure element of the portable computing device using the generated series of cryptographic keys to request that a secure communication channel be established between the secure element of the portable computing device and the central processing unit of the portable computing device, wherein:
    if the generated series of cryptographic keys is correct, the secure communication channel is established; and
    if the generated series of cryptographic keys is incorrect, the request to establish the secure communication channel is denied; and
  if the generated series of cryptographic keys is incorrect, means for determining if a predetermined threshold number of requests to establish a secure connection channel has been achieved; and
  means for authenticating the portable computing device to a server located remotely from the portable computing device with a first substantial encryption key for server authentication, wherein the first substantial encryption key comprises an asymmetric key having a bit length of greater than or equal to 1024 bits.

18. The system of claim 17, further comprising means for activating one or more security measures if the predetermined threshold number of requests has been achieved.

19. The system of claim 18, wherein the one or more security measures comprises permanent disablement of the secure element.

20. The system of claim 17, further comprising means for granting access to the secure element of the portable computing device which comprises at least one of a first substantial encryption key for server authentication with a server remote from the portable computing device and a second substantial encryption key for decrypting encrypted data stored locally within the portable computing device.

21. The method of claim 17, wherein the password based encryption algorithm has a non-padded cipher.

22. The system of claim 17, further comprising means for decrypting encrypted data stored locally within the portable computing device with a second substantial encryption key for decrypting data stored locally.

23. The system of claim 22, wherein the first substantial encryption key comprises a symmetric key having a bit length of greater than or equal to 80 bits.

24. The system of claim 17, wherein the portable computing device comprises at least one of a mobile telephone, a personal digital assistant, a pager, a smartphone, a navigation device, and a hand-held computer with a wireless connection or link.

25. A computer program product comprising a non-transitory computer usable medium having a computer readable program code embodied therein, said computer readable program code adapted to be executed to implement a method for managing secure information within a portable computing device by selective establishment of a secure communication channel within the portable computing device, said method comprising:
  initializing a program module of a central processing unit of the portable computing device for communicating with a secure element of the portable computing device;
  receiving a password, at the central processing unit of the portable computing device, for gaining access to the secure element of the portable computing device;
  initializing a password based encryption algorithm with the password, wherein:
    if the password is correct, initializing the password based encryption algorithm with the password generates a correct series of cryptographic keys; and
    if the password is incorrect, initializing the password based encryption algorithm with the password generates an incorrect series of cryptographic keys;
  exchanging messages between the central processing unit of the portable computing device and the secure element of the portable computing device using the generated series of cryptographic keys request that a secure communication channel be established between the secure element of the portable computing device and the central processing unit of the portable computing device, wherein:
    if the generated series of cryptographic keys is correct, the secure communication channel is established; and
    if the generated series of cryptographic keys is incorrect, the request to establish the secure communication channel is denied;
  if the generated series of cryptographic keys is incorrect, then determining if a predetermined threshold number of requests to establish a secure communication channel has been achieved; and
  authenticating the portable computing device to a server located remotely from the portable computing device with a first substantial encryption key for server authentication, wherein the first substantial encryption key comprises an asymmetric key having a bit length of greater than or equal to 1024 bits.

26. The computer program product of claim 25, wherein the program code implementing the method further comprises activating one or more security measures if the predetermined threshold number requests has been achieved.

27. The computer program product of claim 26, wherein the one or more security measures comprises permanent disablement of the secure element.

28. The computer program product of claim 25, wherein the program code implementing the method further comprises granting access to the secure element of the portable computing device which comprises at least one of a first substantial encryption key for server authentication with a server remote from the portable computing device and a second substantial encryption key for decrypting encrypted data stored locally within the portable computing device.

29. The computer program product of claim 25, wherein the program code implementing the method further comprises utilizing a non-padded cipher in the password based encryption algorithm.

30. The computer program product of claim 25, wherein the program code implementing the method further comprises decrypting encrypted data stored locally within the portable computing device with a second substantial encryption key for decrypting data stored locally.

31. The computer program product of claim 30, wherein the wherein the first substantial encryption key comprises a symmetric key having a bit length of greater than or equal to 80 bits.

32. The computer program product of claim 25, wherein the portable computing device comprises at least one of a mobile telephone, a personal digital assistant, a pager, a smartphone, a navigation device, and a hand-held computer with a wireless connection or link.

* * * * *